United States Patent [19]

Hynes, Jr.

[11] 3,798,602
[45] Mar. 19, 1974

[54] CREDIT AUTHORIZATION SYSTEM

[76] Inventor: John F. Hynes, Jr., 12356 Greekhaven, Des Peres, Mo. 63131

[22] Filed: Jan. 17, 1972

[21] Appl. No.: 218,198

[52] U.S. Cl. .......................... 340/149 A, 340/171 R
[51] Int. Cl. ............................................. H04q 5/00
[58] Field of Search ............................... 340/149 A

[56] References Cited
UNITED STATES PATENTS

| | | | |
|---|---|---|---|
| 3,184,714 | 5/1965 | Brown | 340/149 A |
| 3,394,246 | 7/1968 | Goldman | 340/149 A |
| 3,465,289 | 9/1969 | Klein | 340/149 A |
| 3,657,702 | 4/1972 | Stephenson | 340/149 A |
| 3,696,335 | 10/1972 | Lemelson | 340/149 A |
| 3,601,805 | 8/1971 | Snook | 340/149 A |

Primary Examiner—Harold I. Pitts
Attorney, Agent, or Firm—Koenig, Senniger, Powers and Leavitt

[57] ABSTRACT

Credit authorization by a method of providing credit account information at remote terminals. A radio frequency carrier is modulated with a signal constituting a sequence of encoded data, i.e., credit information, transmitted from a central station to remote terminals, and there retrieved by demodulation of the carrier. Credit information is derived from the retrieved signal by electronically determining coincidence between credit data (e.g., a credit account number) presented at remote terminals with credit data (e.g., a sequence of "bad" credit account numbers) of the retrieved signal.

This is accomplished by apparatus of the system including central means, e.g., a computer, for generating the signal, a central transmitter for transmitting the signal to the remote terminals (preferably through commercial FM broadcasting subcarrier techniques), and receivers at each of the remote terminals. Digital circuitry at the remote terminals makes the coincidence determination.

15 Claims, 4 Drawing Figures

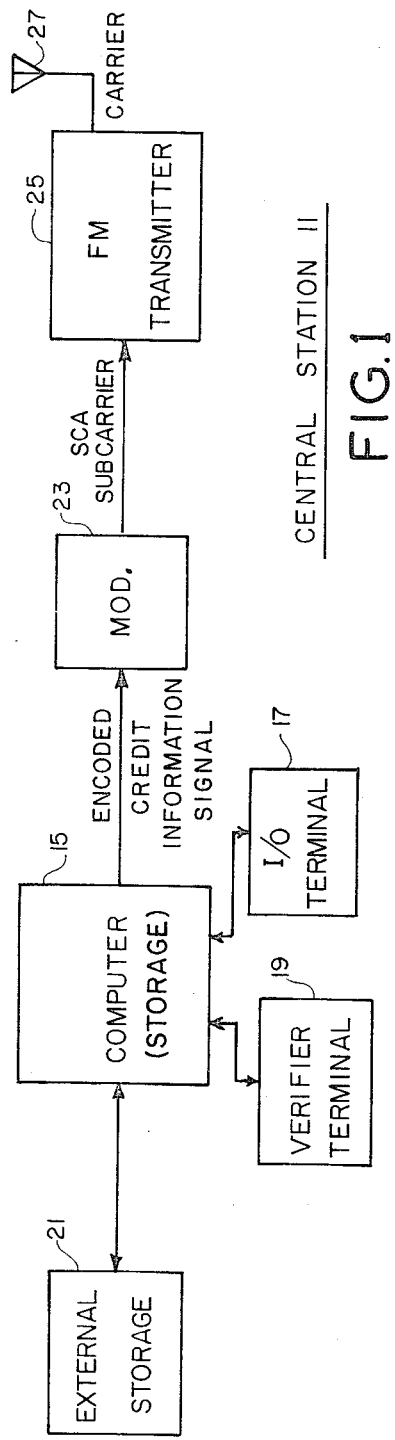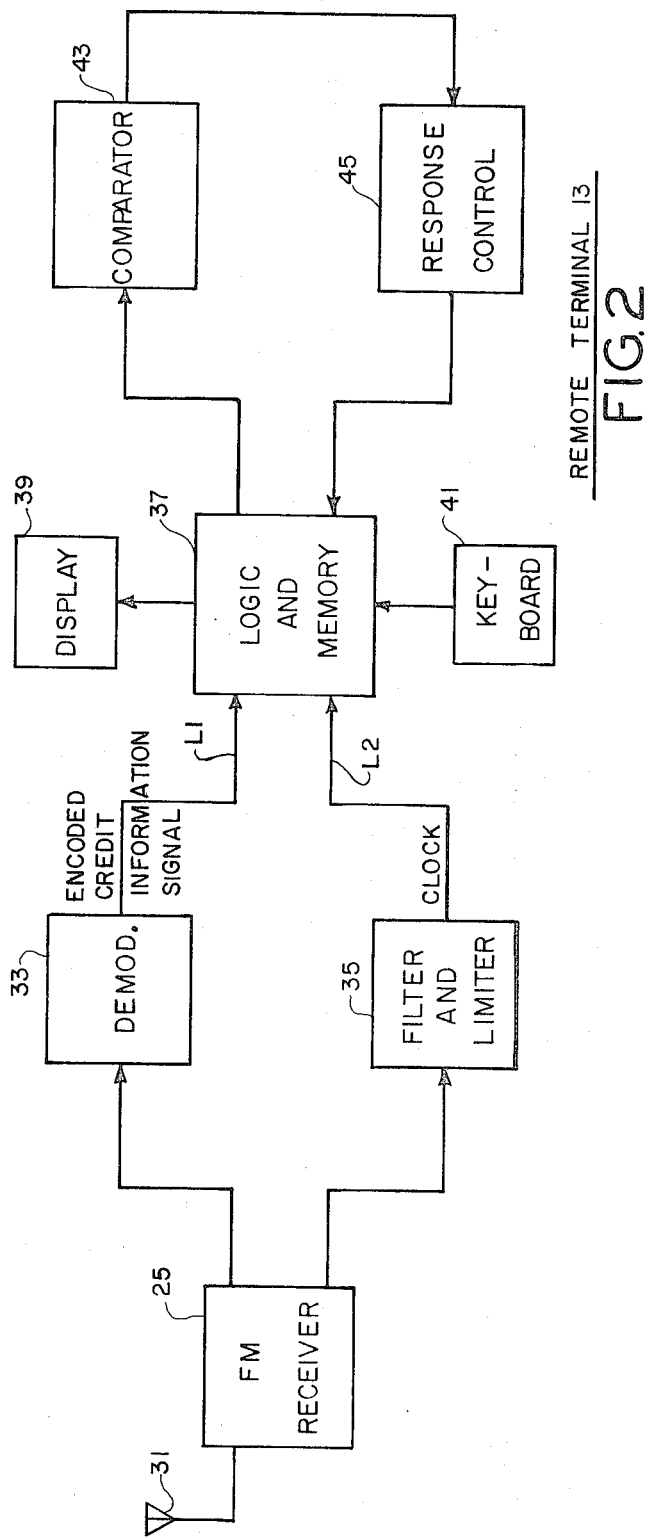

CREDIT AUTHORIZATION SYSTEM

BACKGROUND OF THE INVENTION

This invention relates generally to credit verification or authorization systems and more particularly to improved methods and apparatus for use in determining, i.e., verifying, or authorizing, credit for a credit card or account holder at any of a plurality of remote point-of-sale terminals.

With the growth of credit systems in which credit transactions of diverse types are consummated over a wide geographic area with many individual credit card (i.e., credit account) holders, an increasingly important and burdensome problem has been the need for merchants at points of sale to be able to readily determine the status of "credit worthiness" of a credit card. That is, merchants must be able to know whether or not a customer who presents a credit account number or a credit card representing a credit account number has exceeded some credit limit or whether or not his credit account is otherwise in good order. For example, it is important to determine that a presented credit card has not been stolen or reported lost.

Among the prior art, one type of verification or authorization system which has been used requires that merchants telephone a central verification or authorization office. The merchant provides an operator at the central office with a presented credit account number and other relevant information. A credit verification or authorization determination is then made at the central office and the merchant verbally notified accordingly over the telephone.

In another type of system which has been proposed, pertinent credit data is transmitted electronically from any point of sale over a telephone line to the central office. There the authorization decision is made by a computer and a response sent to a terminal at the point of sale.

In such prior art systems, each credit verification or authorization determination must effectively be made at the central station. Two-way communication over telephone lines is thus required for each such determination. As a result of this two-way communication requirement, such prior art systems entail communication difficulties as the credit system grows in size. That is, as the number of points of sale, the number of credit accounts, and the transaction rate increase, the number and rate of use of telephone lines necessarily also increase in cost and impose equipment and performance limitations. Typically, this means an increase in the cycle time, i.e., the interval between the request at a point-of-sale terminal for the credit verification or authorization determination and the completed response to the request. In prior art systems, it is usually the case that the cycle time is a direct function of the number of terminals participating in the system. Thus, the larger the number of terminals requesting authorization service, the larger the average wait for the completed verification cycle.

It has been proposed to provide a magnetically recorded list of unacceptable credit card numbers for use at individual points of sale, where a credit card can be electronically compared with numbers on the list. Such an approach has been shown in U.S. Pat. No. 3,048,097. This proposal is not practically useful for large credit systems, however, since the total number of unacceptable credit card numbers is limited, as a practical matter, and since the list may not represent the most currently available information.

SUMMARY OF THE INVENTION

Among the objects of the invention may be noted the provision of an improved credit authorization system; the provision of such a system particularly useful for determining credit for a credit account holder at any of a plurality of remote terminals; the provision of such a system including an improved method of providing credit information at such remote terminals; the provision of such a system including apparatus utilizing such credit information to carry out a credit account number coincidence termination; the provision of such a system in which credit verification or authorization time is independent of the number of remote terminals using the system at any time; the provision of such a system in which two-way communication between the remote terminals and a central station is not ordinarily required, thereby obviating high communication costs; and the provision of such a system in which credit verification or authorization determinations are made at remote terminals rather than at a central station; and the provision of such a system which does not impose cost, equipment or performance limitations with growth and size of a credit system utilizing the invention. Other objects and features will be in part apparent and in part pointed out hereinafter.

Briefly, a credit authorization system of the invention is useful in authorizing credit for a credit account holder presenting a credit account number (e.g., a credit card) at any of a plurality of remote authorization terminals, that is to say, at various points of sale, for example. The system includes means for generating a signal constituting a repeating sequence of digitally encoded credit account numbers having credit authorization significance. For example, these numbers preferably may represent "bad" credit cards — cards as to which credit is not authorized. A central transmitter transmits the signal to the remote terminals. For this purpose, the invention contemplates the use of commercial FM broadcasting so called SCA subcarrier modulation. Receivers at the remote terminals receive the subcarrier and the subcarrier is demodulated to retrieve the encoded signal. Coincidence determination apparatus is provided at each of the remote terminals. The latter apparatus includes digital comparator circuitry which digitally compares a credit account number presented at the remote terminal with the "bad" account numbers constituting the signal; and coincidence signalling circuitry indicating, in response to the comparison, whether or not the presented number coincides with one of the "bad" numbers. If there is no coincidence, credit may be authorized for the presented account number.

BRIEF DESCRIPTION OF THE DRAWINGS

FIG. 1 is a block diagram of a central station including means for generating an encoded credit information signal and means for transmitting the signal to a plurality of remote terminals;

FIG. 2 is a block diagram of elements at a remote terminal including digital coincidence determination circuitry.

Corresponding reference characters indicate corresponding parts throughout the several views of the drawings.

DESCRIPTION OF THE PREFERRED EMBODIMENT

GENERAL DESCRIPTION

Figure 3A:
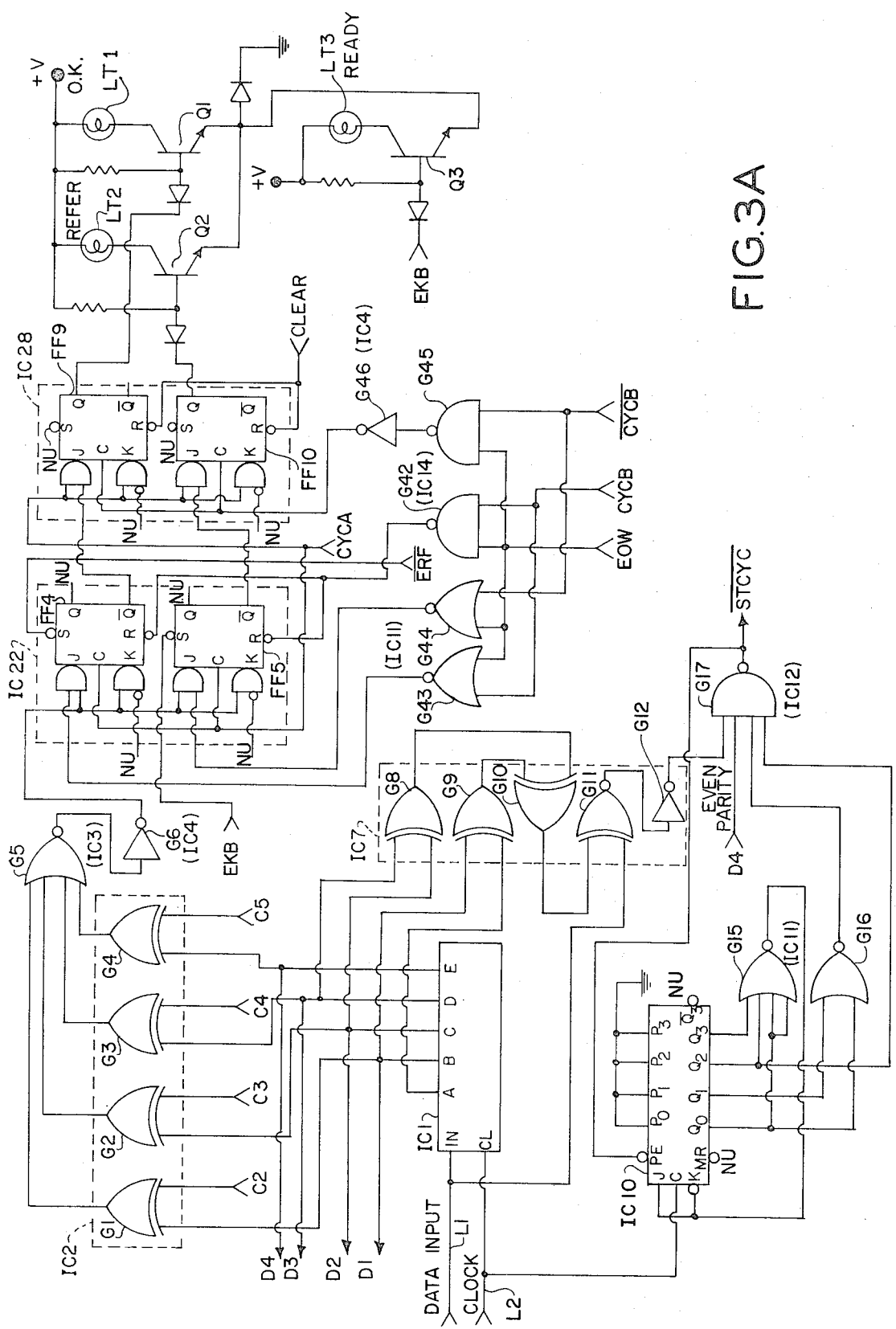
FIGS. 3A and 3B together constitute a schematic circuit diagram of the digital coincidence determination circuitry. Interconnections between these two figures are indicated by appropriate circuit lead identifications or legends.

Referring now generally to FIGS. 1 and 2, a credit authorization system of the invention includes a central station 11, illustrated in block diagrammatic form in FIG. 1, and a plurality of remote terminals 13, each having elements as illustrated in block diagrammatic form in FIG. 2. The remote terminals 13 are respectively provided for use at individual shops, stores, or various other places of business, all of which may be regarded as points of sale. Such points of sale may be scattered over a wide geographic area.

Credit account numbers (represented, for example, by a credit card such as issued by a bank, oil company, or the like) are presented by their holders to merchants at the points of sale for the usual purpose of carrying out a credit transaction. For this purpose, the remote terminal 13 permits a merchant to determine whether or not credit is authorized for a credit account number presented to him. Thus each remote terminal 13 may be regarded as an authorization terminal.

Credit information is provided to each remote terminal 13 by the central station 11. The central station includes a small commercially available digital "mini"-computer 15. This computer, which may be of a general purpose type, stores a so-called negative list of credit account numbers as well as additional information (such as the name of the credit account holder, the credit or debit balance, and any other useful credit information associated with that number). The negative list of credit account numbers represents accounts (e.g., credit card numbers) as to which credit is unacceptable.

Each so-called negative number may thus represent a credit card that merchants should not accept for a credit transaction because, for example, the credit card has been stolen or reported lost, or its holder is in arrears as to payment, and so forth. As such, these negative numbers have special credit significance. It is possible, of course, for "good" credit card numbers to be transmitted, rather than "bad" numbers. Other types of credit account numbers having special credit significance may also be desirably transmitted to the remote terminals.

A conventional input/output terminal 17 (such as a teletype unit or a tape reader, etc.) is used for entering, updating and changing the credit data stored in computer 15. A verifier unit or terminal 19 may also be used with computer 15 for verification of credit authorization. The verifier unit may be constituted by a teletype terminal or a cathode ray tube device which is stationed either at the central station or remotely connected with it to provide an operator with verification of information stored in computer 15 plus additional information, such as reasons for a credit account number being "bad". An external data storage facility 21, such as magnetic drum, disc or tape components, may be used for certain credit record-keeping purposes.

Computer 15 is programmed in conventional manner to supply an encoded credit information signal. This signal is preferably a continuously repeating sequence or loop-form digital train of the negative credit account numbers in serially-encoded binary form. So-called NRZ binary coding may be used. Other types of coding, such as Aiken or Manchester, may instead be used. It is preferred to generate the credit account numbers which constitute the encoded credit signal in the form of "words" or groups of binary characters each consisting of a start bit, a four-bit data byte (coded 0 through 9 with normal binary representation) identifying the particular credit account, and an even parity bit that does not cover the start bit. Thus there are six bits to a character.

A conventional modulator 23 at central station 11 imposes the encoded credit data signal or digital train onto a subcarrier which is used to modulate the main carrier of an FM commercial broadcasting transmitter 25. This radio carrier is then transmitted wirelessly by an antenna 27 or via transmission line or cable (as employed for cable TV-FM transmission).

In accordance with this invention, the subcarrier is that associated with the so-called SCA (Subsidiary Communications Authorizations) broadcasting option by which commercial FM stations provide subsidiary services to subscribers in addition to the usual main carrier or stereo subcarrier signals. This SCA subcarrier generally is centered at 67 KHz above the base frequency of the FM station and thus is of a frequency high enough to avoid interference with the main carrier or stereo subcarriers of the station. The SCA subcarrier is not audible using ordinary FM receivers, but instead requires a specialized detector.

Along with this encoded credit information, a clock signal is transmitted. The 19 KHz pilot signal, present during normal FM stereophonic broadcasting, advantageously may serve as the clock signal. As an alternative, the coding itself may be used to generate a clock signal, as when employing Aiken coding.

Preferably, computer 15, input/output terminal 17, verifier terminal 19, external storage facility 21 and modulator 23 occupy the same general location as transmitter 25, although it will be understood that these component parts of the central station may actually be located in different rooms or buildings and yet be interconnected.

Remote Terminals

Each remote terminal 13 generally includes an FM receiver which is pretuned for receiving the FM carrier transmitted by transmitter 25 via an antenna 31 (or via transmission line). A demodulator 33 of the type known to those skilled in the art demodulates the SCA subcarrier frequency to detect and thus retrieve the encoded credit information, i.e., credit data signal. Conventional filter and limiter circuitry 35 is employed to retrieve the 19 KHz FM pilot beacon as a clock signal.

The binary encoded credit signal, i.e., the data, and the clock signal are supplied to logic and memory circuitry 37 with which are interconnected a display 39, a keyboard 41, digital comparator circuitry 43, and certain response and control circuitry 45. Elements 37, 39, 41, 43 and 45 together constitute digital means for determining coincidence between credit account numbers presented at remote terminal 13 and individual ones of the specially significant ("bad" or so-called negative) credit account numbers of the encoded signal received by receiver 25.

Display 39 provides the merchant or other operator using remote terminal 13 with appropriate visual information including the status of the coincidence determination circuitry and indications of coincidence determination. Keyboard 41 is employed for entering a presented credit account number into memory components of circuitry 37. It will be understood, of course, that other devices could be used in place of keyboard 41, such as a magnetic credit card reader or optical character recognition (OCR) devices.

When a presented account number has been entered by keyboard 41, a coincidence determination is made as the encoded credit information signal is received. The display 39 then automatically indicates whether or not the entered account number is one of those on the repeating negative list which constitutes the encoded credit data signal.

Figure 3B:
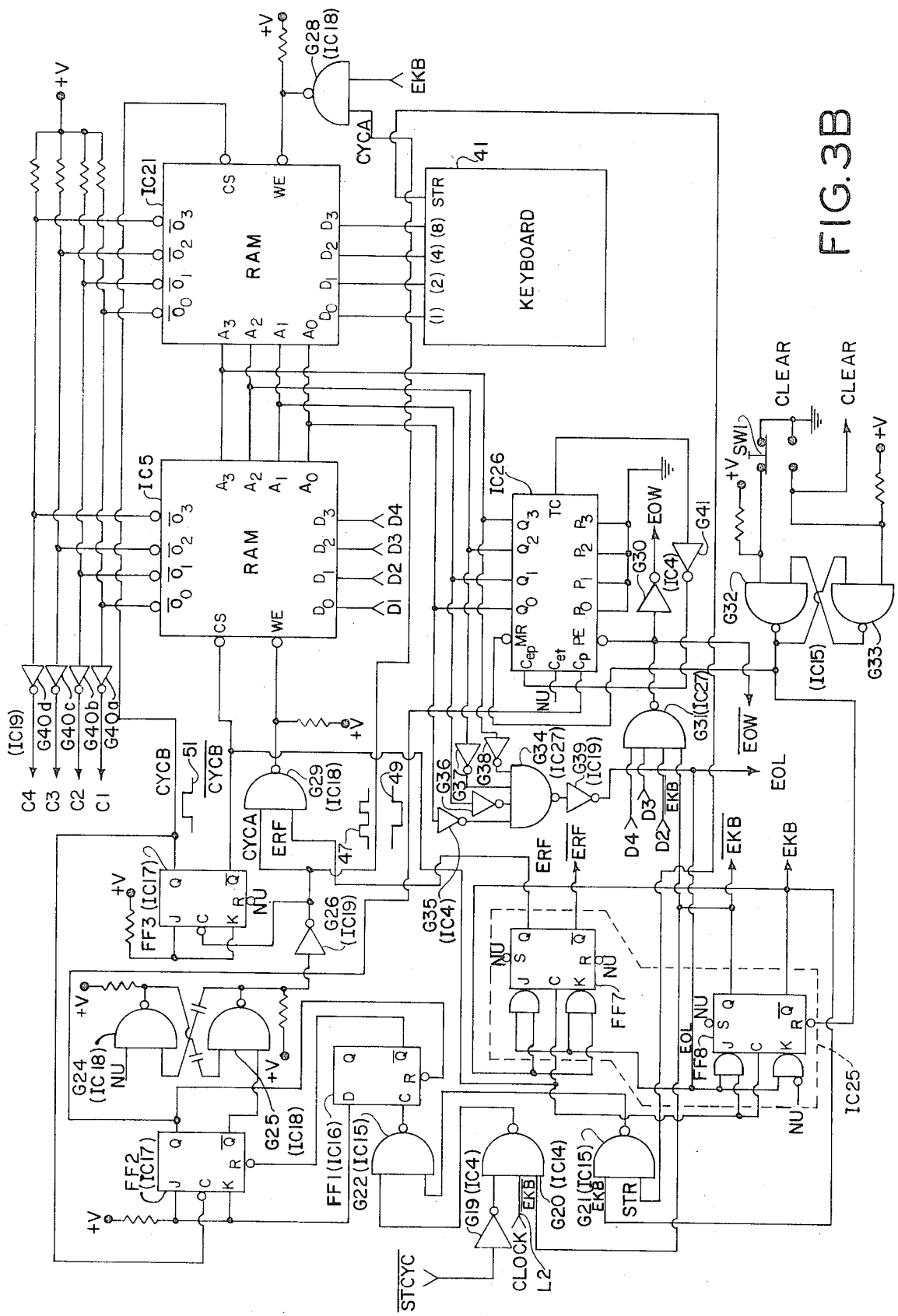

Referring now to FIGS. 3A and 3B, and particularly to FIG. 3A, the coincidence determination circuitry includes numerous digital integrated circuit devices. These devices are in the form of commercially available monolithic integrated circuit modules which are simply referred to herein as "integrated circuits". Such devices, which include logic gates whose output is a logical function of the inputs thereto, are herein said to supply an output signal (or to be supplied with an input signal) when the respective output (or input) is at a distinct "high" level or logical "1" state as opposed to a "low" level or logical "0" state. Positive logic is assumed. For reasons of clarity, there have not been illustrated all of the various conventional supply voltage connections for the logic gates and integrated circuits shown in the drawings. Unused inputs or outputs of such gates or other devices are indicated in the drawings by the legend NU.

The signal carrying the encoded credit data and the clock signal are supplied via respective leads L1 and L2 to the data input and clock inputs of a five-bit integrated circuit input buffer designated IC1 and actually constituted by a serial-to-parallel converter. Integrated circuit IC1 has five parallel outputs indicated by legends A-E and supplying parallel output bits or signals D0-D5.

Parallel outputs B-E of integrated circuit IC1 feed output signals D1-D4 to four-bit digital comparator 43. Comparator 43 comprises four exclusive-OR gates G1-G4 (integrated circuit IC2), a NOR gate G5 (IC3), and an inverter G6 (IC4). The parallel data bits D1-D4 are supplied, as indicated by arrow symbols, to other circuits, including an integrated circuit 64-bit random access memory (RAM)IC5 discussed later.

The serial data input signal and the parallel data bits D0-D3 are supplied to an integrated parity check circuit IC7 having exclusive-OR gates G8-G11 and an inverter G12 connected as indicated. Circuit IC7 provides a check for even parity of the input bits and the result is made available to a four-input NAND gate G17 (IC12). The extracted data start bit D4 is supplied to one input of gate G17.

The coincidence determination circuitry includes means for synchronizing its operation to groups of characters, i.e., the words of the incoming data signal in such a way that certain cycling operations of the circuitry controlling comparison are properly "locked" in synchronism with the six-bit data words. This synchronizer means includes a binary integrated circuit presettable shift counter IC10, two NOR gates G15 and G16 of an integrated circuit IC11, and a four-input NAND gate G17 of an integrated circuit IC12. Counter IC10 is connected to sequence (shift) either six or seven counts according to whether "lock" to a data word is detected on the sixth state of the counter or not.

The clock signal is supplied (via lead L2) to the clock ("C") input of counter IC10 to cause it to sequence with each clock pulse. If the start bit D4 and the parity check signal from circuit IC7, both supplied to gate G17, are both high at the sixth count of counter IC10, a negative going signal $\overline{STCYC}$ supplied to the preset entry input ("PE") of counter IC10 presets the counter to zero. If both signals are not high ("1") at the sixth count of the counter, signal $\overline{STCYC}$ remains high and thus the counter is permitted to sequence to its seventh state. The negative-going signal $\overline{STCYC}$ is supplied to another section of the circuitry for use in initiating certain cyclic operation by cyclic control means described below, permitting operation of comparator 43.

Cyclic operation is thus prevented or inhibited until signal $\overline{STCYC}$ goes low. This does not occur, as noted, unless the start bit D4 and the parity check signal are both high at the sixth state of counter IC10, thereby signalling synchronism with the incoming data. It will be noted that if this situation does not occur, counter IC10 will continue to repeatedly count to its seventh state until synchronism does occur. I.e., the counter lags the word length by one count until synchronization is reestablished.

The cycle control means in effect generates certain "read" or "write" and "compare" commands asynchronously with the input clock. This means includes the following elements (see FIG. 3B): an inverter G19 (IC4) for inverting the start-cycle signal $\overline{STCYC}$; a NAND gate G20 (IC14) to which the inverted signal is supplied; NAND gates G21 and G22 (IC15); a D-type flip-flop FF1 (IC16); J-K flip-flops FF2 and FF3 (IC17); an astable multivibrator constituted by NAND gates G24 and G25 (IC18) capacitively cross-connected; and an inverter G26 (IC19). The multivibrator frequency is preferably at least ten times that of the clock signal repetition frequency.

The "read" or "write" and "compare" commands generated by the cycle control circuitry affect operation of random access memory (RAM) IC5 and another identical RAM IC21. The latter is employed to store the presented credit account number selected by keyboard 41. Keyboard 41 is a commercially available matrix-type pushbutton unit or the like with pushbuttons having designations such as 0 through 9. The keyboard 41 has outputs ("1-2-4-8") and a strobe output ("STR") supplying a strobe signal as each pushbutton is depressed. Information is permitted to be "written" or stored in RAM's IC5 and IC21 when a signal is provided to the so-called write enable input ("WE") of the respective RAM. For this purpose, a two-input NAND gate G28 (IC18) has its output interconnected with the write enable input of RAM IC21. The latter input is biased to a supply voltage +V through a resistor. A similar NAND gate G29 (IC18) is connected to the write enable input of RAM IC5.

Operation of the cycle control circuitry (the "cycler") is triggered by either of two types of input signals, viz., from keyboard 41 or clock signals together with the start-cycle signal STCYC from the synchronizer upon word "sync". Once triggered, the cycler sequences through certain states to generate pulses necessary to "write" into the RAM's IC5 and IC21, to select the RAM into which information is to be written, and to strobe certain comparator flip-flops FF4 and FF5 (IC22). Briefly, these input signals are provided, if from the keyboard, to NAND gate G21 and, if from the clock and synchronizer, to NAND gate G20.

Then the cycler is triggered, inverter G26 supplies a double-pulsed signal CYCA (designating "Cycle A") with a waveform indicated at 47 adjacent inverter G26, while flip-flop FF3 supplies a single pulsed signal CYCB ("Cycle B") at its Q output and the inverted signal $\overline{CYCB}$ (waveform 49) at its $\overline{Q}$ output. Signals CYCA (waveform 51) and $\overline{CYCB}$ are supplied to the "CS" (chip select) input of the respective RAM's IC21 and IC5. Signal CYCA is used to clock flip-flop FF3 for this purpose and is also supplied to NAND gates G29 and G28.

Two gated J-K master-slave flip-flops FF7 and FF8 (IC25) are clocked by signal $\overline{CYCB}$ to generate signals ERF, $\overline{ERF}$, EKB and $\overline{EKB}$. Signal ERF enables writing of an encoded credit account number into RAM IC5, signal $\overline{ERF}$ is used to preset comparator flip-flop FF4, signal EKB enables writing of a presented credit account number by keyboard 41 into RAM IC21, and signal $\overline{EKB}$ is delivered to one input of NAND gate G20.

An integrated circuit IC26 with certain peripheral circuits acts as a so-called work counter for addressing the RAM's (IC5 and IC21). It comprises a sixteen-bit synchronous counter with parallel synchronous preset entry. I.e., the counter controls or determines in which of the bit locations of the RAM's are to be stored the bits defining credit account numbers. The counter is clocked by operation of flip-flop FF2. Thus, it is advanced each time the cycler completes its cycle. Counter IC26 is set to a zero-count in either of two ways. That is, if data is not being entered into RAM IC21 by means of keyboard 41 (signal $\overline{EKB}$ high), counter IC26 is reset by an inverted end-of-word signal $\overline{EOW}$ supplied to its preset entry (PE) input (noting that each of the preset data inputs is grounded). The noninverted end-of-word signal EOW is supplied to other circuits by an inverter G30 (IC4). The end-of-word signal $\overline{EOW}$ is generated by a four-input NAND gate G31 (IC27) which receives data outputs D2, D3 and D4 and the signal $\overline{EKB}$. Alternatively, word counter IC26 is asynchronously reset to zero (for permitting use of keyboard 41) in response to operation of a so-called "CLEAR" switch SW1 by a cross-coupled pair of NAND gates G32 and G33 (IC15). Operation of switch SW1 also resets flip-flop FF8 when the latter is enabled.

The outputs ($Q_0$-$Q_3$) of counter IC26 are interconnected with the address inputs ($A_0$-$A_3$) of RAM's IC5 and IC21. Addressing of the RAM's is such that the first character supplied by the outputs of keyboard 41 or the first character of the "first number" of the incoming data is stored in (binary) location 0000 of the respective RAM. Successive digits are stored in locations 0001 through 1110 (if there are fourteen digits). The fifteenth binary location 1111 is not used, the fifteenth state of counter IC26 being reserved for the start character to be processed. The start character is detected by the four-input NAND gate G31 (IC27) to reset the counter to zero. Start words 1111 and 1110 are both accepted.

When keyboard 41 is being employed, resetting of word counter IC26 is effected by another four-input NAND gate G34 (IC27) which monitors the count of counter IC26. For this purpose, inverters G35-G38 (IC4), properly chosen for the desired word length, interconnect the inputs of gate G34 with the outputs $Q_0$-$Q_3$ of counter IC26. The output of NAND gate G34 is inverted by an inverter G39 (IC19) to provide a so-called end-of-load signal EOL which enables resetting of flip-flop FF8 (IC25). When signal EKB thus goes low, flip-flop FF7 supplies at its Q output a signal ERF (representing an "enable-read-of-first number" function) which is delivered to gate G29. This supplies a write-enable signal to RAM IC5 thereby to write the first whole number received as incoming data into RAM IC5.

In order to get word counter IC26 in "sync" with the incoming data, it is necessary to prevent resetting of the work counter until a start character of the incoming data is received. Accordingly, counter IC26 is not reset upon completion of the use of keyboard 41, but is instead permitted to count upward until it is reset by a new start word. However, the counter is prevented from overflowing by feeding back its total count output (terminal TC) through an inverter G41 (IC4) to the count enable parallel ($C_{ep}$) input of the counter.

Flip-Flop FF7 terminates the ERF signal at the end of the "first word" and the "write" cycles are completed. It may be noted that information is stored or written into RAM's IC5 and IC21 on different cycles (corresponding to the presence of signals ERF and EKB, repectively), but the information stored in the RAM's is actually "read" every cycle in order to compare the incoming credit data with the contents of both RAM's.

Such a comparison is, as noted previously, carried out by the comparator circuitry (FIG. 3A) which is supplied with the stored data C1-C4 by inverters G40a-G40d (IC19) by multiplexing, in effect, the information at the outputs ($\overline{O_0}$-$\overline{O_3}$) of RAMS IC5 and IC21. The output of inverter G6 of the comparator circuitry is supplied to so-called comparator flip-flops FF4 and FF5. In effect, flip-flop FF4 "looks for" a match or coincidence between the received credit account number previously stored in RAM IC5 and a decoded credit account number of the received data. That is, flip-flop FF4 looks for the completion of a comparison sequence or cycle. Flip-flop FF5 looks for coincidence between the presented credit account number stored in RAM IC21 by keyboard 41 and a credit account number of the received data.

It will be noted that flip-flops FF4 and FF5 are both initially reset by a NAND gate G42 (IC14) when signal CYCB goes high while signal EOW is high. The J-K inputs are enabled by NOR gates G43 and G44 (IC11) as shown. This resetting begins a comparison cycle. As each character of the data signal is received in succession, the contents of RAM IC21 are compared to the data on lines D1-D4 during the period while signal $\overline{CYCB}$ is high. If there is coincidence of RAM IC21's contents with the data, flip-flop FF5 is left reset. If there is no coincidence, the flip-flop FF5 is set by signal CYCA. Then, during the period while signal CYCB is high the contents of RAM IC5 and the data on lines D1-D4 are compared, flip-flop FF4 being left reset or set by signal CYCA depending upon whether there is coincidence or no coincidence, respectively.

Such comparison is carried out for each character in both RAM's from the first location (0000) to that (e.g., 1110) of the last character of the "word". Additional J-K master-slave flip-flops FF9 and FF10 (IC28) are responsive to the results of the comparison. These flip-flops are clocked in response to signals EOW and $\overline{CYCB}$ supplied to a NAND gate G45 (IC 14) whose output is inverted by an inverter G46 (IC4) interconnected with the clock inputs of the flip-flops. Accordingly, flip-flop FF9 is adapted to be clocked at the end of the comparison cycle of operation of flip-flop FF4, causing an NPN transistor Q1 to be biased into conduction. This energizes a so-called "O.K." light LT1.

Similarly, flip-flop FF10 is adapted to be clocked at the end of the comparison cycle in response to operation of flip-flop FF5, causing energization by conduction of transistor Q2 of a so-called "REFER" signal light LT2. A third and so-called "READY" signal LT3, associated with the other lights on a suitable control panel, is adapted to be energized by conduction of a transistor Q3 in response to signal EKB. Resetting of flip-flops FF9 and FF10 is provided by operation of the "CLEAR" switch SW1.

OPERATION

It will be understood that the digital stream of data (and clock signal) comprising binary encoded credit account numbers is continuously transmitted from central station 11 to the remote terminals. As noted, the account numbers are serially encoded and are transmitted in a repeating loop or sequence, each sequence including all of the account numbers stored in computer 15 of the same credit significant (e.g., "bad" oil company credit cards). It may be noted that different sets of data corresponding, for example, to different types of credit cards (such as oil company cards, bank cards, etc.) may additionally constitute the data stream. In this respect, certain "key" digits of a credit account number may be used to designate the appropriate credit card system a number is associated with. Also, some or all of the sets of data may be cryptographically encoded for transmission so as to prevent use thereof except at remote terminals having suitable cryptographic decoding equipment.

At any one of the remote terminals 13 where the encoded information is received, the following typical steps illustrate operation of the system:

1. A customer, i.e., the holder of a credit card, presents the card (or otherwise presents a credit account number) to the merchant or operator at the remote terminal 13.
2. The merchant or operator operates "CLEAR" switch SW1 to reset word counter IC26, flip-flops FF8, FF9 and FF10 and thus extinguish any illuminated signal lights. Signal EKB causes the "READY" light LT3 on the control panel to be illuminated, signalling that the presented credit account number may be entered by means of keyboard 41. The operator punches out the credit account number on keyboard 41 and the number is stored in RAM IC21. As noted previously, an automatic card reader may be used for this purpose in lieu of keyboard 41.
3. When the correct number of digits have thus been entered by keyboard 41, the logic circuitry causes a received "first" one of the credit account numbers of the incoming data to be stored in RAM IC5 and comparison is automatically initiated, the comparator carrying out a parallel bit-for-bit comparison of each of the subsequently received account numbers of the data with the two numbers stored in the RAM's.
4. If there is no coincidence between the presented account number and one of those in the incoming data, when coincidence between the stored "first" one of the received numbers and one (i.e., the same one) of the subsequently received numbers is detected (indicating that all of the numbers of a sequence have been compared), the "O.K." signal light LT1 is illuminated by operation of flip-flop FF9. From this, the merchant or operator may conclude that the presented account number is a "good" one. The credit transaction may then be completed (i.e., credit is extended to the individual presenting the number).
5. If, however, there is coincidence between the presented account number and one of those of the incoming data, operation of flip-flop FF10 causes illumination of "REFER" signal light LT2. Upon receiving the "REFER" response, the operator can simply refuse to extend credit for the presented account number or, according to the policy of the credit system, he may in addition verify that the presented account number is "bad" by calling a designated vertification office. The verification office then uses verifier terminal 19 to ascertain that the referred account is on the "negative" list and the reasons therefor. The merchant or terminal operator, advised accordingly, then follows appropriate policy such as picking up the "bad" card.

Each remote terminal 13 may, if desired, be used with suitable means for automatically marking a transaction form or receipt at the completion of the comparison cycle to verify that the presented account number was actually compared with the "negative" list received at the remote terminal.

The advantages of the system are now apparent. Telephoned communications as in the prior art are not required for each credit transaction, the credit authorization determination being made at the point of sale. All remote terminals have speedy, simultaneous access to the credit information transmitted from the central station without regard to the number of terminals or the number of transactions being carried out at any particular time.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A credit authorization system for use in authorizing credit for a credit account holder presenting a credit account number at any of a plurality of remote authorization terminals, said system comprising:
   means for generating a signal constituting a repeating sequence of digitally encoded credit account numbers having credit authorization significance;
   central FM radio frequency transmitter means for transmitting said signal in the form of a modulated FM SCA subcarrier to said authorization terminals;

means at each of said authorization terminals for receiving said subcarrier and for demodulating said subcarrier to retrieve said signal;

digital comparator means at each of said authorization terminals for digitally comparing the credit account number presented at any of said authorization terminals with the significant credit account numbers of said sequence; and coincidence signalling means interconnected with the respective comparator means at each of said authorization terminals for indicating whether or not the presented credit account number coincides with any one of the significant credit account numbers of said sequence, whereby credit may be authorized for the presented credit account number according to indication of coincidence.

2. A credit authorization system as set forth in claim 1 further comprising memory means at each of said authorization terminals for electronically storing the presented account number for comparison by said comparator means with the significant credit account numbers of said sequence.

3. A credit authorization system as set forth in claim 2 further comprising means at each of said authorization terminals for signalling the absence of coincidence of the stored credit account number with the significant credit account number of said sequence.

4. A credit authorization system as set forth in claim 3 wherein said means for signalling the absence of coincidence comprises further memory means for electronically storing one of the credit account numbers of said sequence as it is received, said digital comparator means being operative also for digitally comparing said one credit account number stored in said further memory means with subsequently received credit account numbers of said sequence, and means for indicating coincidence of said stored one account number with a subsequently received credit account number of said sequence.

5. Apparatus for electronically determining coincidence of credit account numbers or the like, said apparatus comprising:

means for receiving an FM radio frequency SCA subcarrier and for demodulating said subcarrier to detect a signal constituting a repeating sequence of serially encoded credit account numbers having special credit significance;

first memory means for storing one of the numbers of said sequence as said signal is received;

number selector means for selecting a predetermined credit account number for comparison thereof with credit account numbers of said sequence;

second memory means for storing the selected credit account number;

digital comparator means for comparing individual numbers of said sequence as said signal is received with the numbers stored in each of said memory means;

means responsive to operation of the comparator means for signalling coincidence of the number stored in said second memory means with one of the numbers of said sequence, thereby to indicate that the selected credit account number is one of said credit numbers having special credit significance; and means responsive to operation of the comparator means for signalling coincidence of the number stored in said first memory means with one of the numbers of said sequence, thereby to indicate that the selected credit account number is not one of said credit account numbers having special credit significance.

6. Apparatus as set forth in claim 5 wherein said signal is constituted by groups of binary characters defining said encoded credit account numbers and further comprising cycling means for causing said digital comparator means to cycle alternately between binary comparison of the character groups defining numbers of said sequence with the number stored in said first memory means in binary form and comparison of the character groups defining numbers of said sequence with the number stored in said second memory means in binary form.

7. Apparatus as set forth in claim 6 wherein said cycling means comprises at least one bistable switching device.

8. Apparatus as set forth in claim 6 including synchronization means for causing operation of said digital comparator means in synchronization with said groups of characters of said signal.

9. Apparatus as set forth in claim 7 wherein said synchronization means comprises binary counter means interconnected with the cycling means and adapted to repeatedly count up to a predetermined number of counts dependent upon synchronization with said groups of characters of said signal.

10. Apparatus as set forth in claim 9 wherein said binary counter means is adapted to count to a first predetermined number of counts greater than the number of characters in each of said groups in the absence of synchronization with said groups of characters and to count up to a second predetermined number of counts equal to the number of characters in each of the groups when there is synchronization with said groups of characters.

11. Apparatus as set forth in claim 5 wherein each of said memory means comprises a random access memory having a plurality of binary bit locations for storing bits defining the stored numbers.

12. Apparatus as set forth in claim 11 including further binary counter means for controlling in which of said bit locations are stored the bits defining the stored numbers, said counter means being adapted to count up to a preselected number corresponding to the number of digits of said selected credit account number.

13. Apparatus as set forth in claim 11 wherein said number selector means comprises a keyboard adapted to be operated for generating bits for storage in ones of said bit locations.

14. Apparatus as set forth in claim 5 wherein said signal is constituted by binary data in serial form and further comprising means for converting the serial form data to parallel form for comparison by said comparator means.

15. Apparatus as set forth in claim 14 wherein said signal is constituted by groups of bits including a parity bit and further comprising parity check means responsive to said data and parity bit for inhibiting comparison by said comparator means if parity is incorrect.

* * * * *